United States Patent
Van Buer et al.

(10) Patent No.: US 7,460,948 B2
(45) Date of Patent: Dec. 2, 2008

(54) TRAFFIC NOTIFICATION SYSTEM FOR REPORTING TRAFFIC ANOMALIES BASED ON HISTORICAL PROBE VEHICLE DATA

(75) Inventors: Darrel J. Van Buer, Los Angeles, CA (US); Son K. Dao, Northridge, CA (US); Xiaowen Dai, Shelby Township, MI (US); Richard A. Johnson, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 455 days.

(21) Appl. No.: 11/372,721

(22) Filed: Mar. 10, 2006

(65) Prior Publication Data

US 2007/0213922 A1    Sep. 13, 2007

(51) Int. Cl.
*G08G 1/00* (2006.01)
(52) U.S. Cl. ..................... 701/117; 701/118

(58) Field of Classification Search ............... 701/36, 701/204–213, 117–119; 340/995.11–995.23
See application file for complete search history.

(56) References Cited

U.S. PATENT DOCUMENTS

| | | | | |
|---|---|---|---|---|
| 6,405,132 | B1 * | 6/2002 | Breed et al. | 701/301 |
| 7,103,460 | B1 * | 9/2006 | Breed | 701/29 |
| 7,110,880 | B2 * | 9/2006 | Breed et al. | 701/207 |

\* cited by examiner

*Primary Examiner*—Richard M. Camby

(57) ABSTRACT

A system and method for determining and communicating a traffic anomaly at a point to at least one receiving vehicle includes a traffic information center and at least one probe device. Each probe device is configured to determine and store within an on-board database a current value of a condition at the point during each of a plurality of trips, so as to build a history of condition values. The probe device is further configured to compare the current value to the historic values during each trip, and selectively transmit notification of an anomalous value to the center.

24 Claims, 5 Drawing Sheets

| Probe Vehicle Speed Condition ||||
| Reporting Thresholds: -10 mph; -20 mph; +10 mph ||||
| | Cur. value | Ave. History | PV action | TIC action |
| --- | --- | --- | --- | --- |
| 1 | 49 | 40 | -- | -- |
| 2 | 31 | 41 | notify | Alert "Traffic Slow" |
| 3 | 16 | 39 | notify | Alert "Traffic Jam" |
| 4 | 10 | 39 | -- | -- |
| 5 | 38 | 39 | notify | Remove Alert |
| 6 | 51 | 41 | notify | Alert "Traffic Clear" |

TRAFFIC NOTIFICATION SYSTEM FOR REPORTING TRAFFIC ANOMALIES BASED ON HISTORICAL PROBE VEHICLE DATA

TECHNICAL FIELD

The present invention relates to systems for and methods of collecting traffic data using probe vehicles, and more particularly, to a system for obtaining and recording a history of traffic condition values at the probe vehicle, comparing a current condition value to the history, selectively reporting a notification to a traffic information center, and transmitting an alert based on the notification to at least one receiving vehicle.

BACKGROUND OF THE INVENTION

It is known in the prior art to use vehicles as probes for measuring traffic conditions in real-time. Individual vehicles provide "floating car data," such as, for example, the vehicle's time, speed, position, and heading, which can be used to estimate travel time and traffic speed, and which can in turn be used to alert other operators to an approaching condition variance, as an online indicator of road network status, as a basis for detecting incidents, or as input for a dynamic route guidance system.

Prior art probe vehicle systems typically include a plurality of probe vehicles; technology for determining each probe vehicle location, such as, for example, a system using orbiting satellites, such as the Global Positioning System (GPS), a system using cellular telephones, or a system using radio-frequency identification (RFID); and a wireless communication system for allowing communication between the vehicles and a traffic information center (TIC). Typically, the center receives and processes the data generated by the probe vehicles, and then transmits a signal based on the data to a plurality of receiving vehicles, which may further include non-probe vehicles.

Constant communication between the probe vehicles and the center, however, requires the storage of a voluminous amount of data at the center. As additional vehicles join the system, other scalability concerns are presented. First, the system requires constant communication between an exceedingly large number of probe vehicles and the center to maintain an entire map database of traffic information. A substantial data processing capacity is necessary at the center to process the large volume of data in real-time. Finally, typical communication means are similarly impacted by the addition of vehicles, and must be sized accordingly, even though communication quantities are often well below peak.

These concerns reflect the inverse proportionality of capacity and efficiency in central processing systems, and the need in the art for a traffic information system that reduces data storage and processing requirements at the center.

SUMMARY OF THE INVENTION

Responsive to these and other concerns, the present invention presents a method of selectively transmitting traffic data from a probe vehicle to a center and delivering traffic information to a remote location or at least one receiving vehicle. Among other things, the present invention is useful for reducing the amount of data transmissions, and therefore, the amount of data received by conventional traffic information centers. The reduction in data management enables system resources and transmission capacity requirements to be reduced, resulting in a more efficiently operating and cost-effective system.

A first aspect of the invention concerns a traffic information system for determining and communicating a traffic anomaly to at least one receiving vehicle. The system includes a traffic information center configured to determine and transmit an alert to the receiving vehicle. At least one probe device is communicatively coupled to the center, and configured to determine a current value of a condition at a point during each of a plurality of trips, and store the current values in an on-board database, so as to present a history of condition values. The probe device is further configured to compare each current value to the history of condition values, so as to determine a condition discrepancy during each trip, and transmit a notification to the center, only when the discrepancy is greater than a pre-determined discrepancy threshold. Finally, the center is further configured to generate the alert based upon the notification.

Further aspects of the present invention include communicating the traffic anomaly to a remote location, where a monitoring device is configured to generate a perceptible signal upon receipt of the notification, and transmitting the alert to at least one receiving vehicle located upon a link.

These and other features of the present invention are discussed in greater detail in the section below titled DESCRIPTION OF THE PREFFERED EMBODIMENT(S).

BRIEF DESCRIPTION OF THE DRAWINGS

Preferred embodiment(s) of the present invention are described in detail below with reference to the attached drawing figures, wherein.

DESCRIPTION OF THE PREFERRED EMBODIMENT(S)

Figure 1:
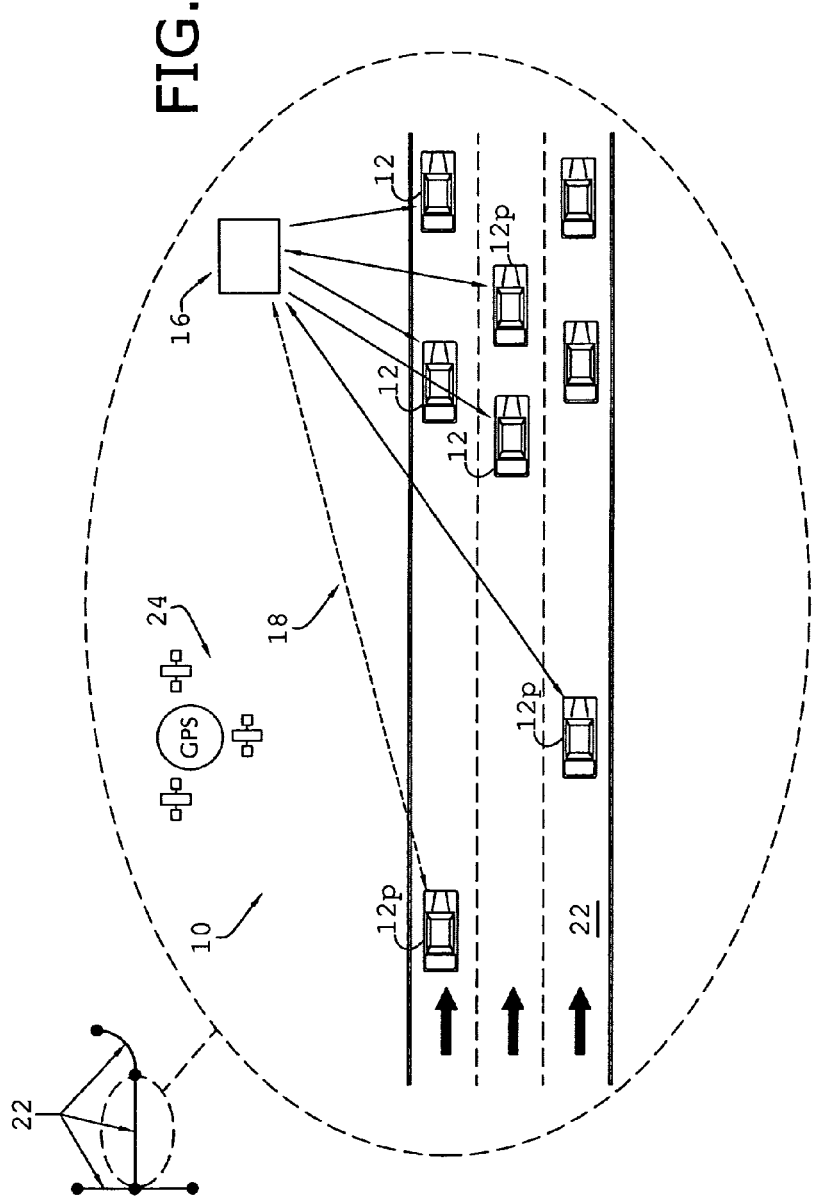
FIG. 1 is a depiction of a traffic control system in accordance with a preferred embodiment of the present invention, particularly illustrating a TIC receiving data from probe vehicles, and transmitting data to receiving vehicles.

The present invention concerns an improved traffic information system 10 adapted for use with a vehicle 12, and by an operator 14. The system 10 further includes a central traffic information center (TIC) 16, and wireless communication means 18 for bilaterally delivering electronic signals between the TIC and vehicle 12. The system 10 is described and illustrated herein with respect to an automotive vehicle, however, it is appreciated by those ordinarily skilled in the art that the system 10 may be used in conjunction with other devices, transportation machines and modes, such as boats, aircrafts, and human motility. The function and operation of the system 10 is described herein with respect to one vehicle 12, however, it is understood and appreciated that the preferred TIC 16 is configured to concurrently communicate as described with a plurality of properly configured vehicles 12.

Broadly, as shown in FIG. 1, at least a portion of the vehicles 12 also present probe vehicles 12p that are each configured to autonomously determine a traffic anomaly, and transmit a notification of the same to the center 16 or a remote location. The center 16 is configured to generate and transmit to the receiving vehicles 12 an alert based on the notification. For example, the probe vehicle 12 may be configured to determine and transmit an anomalous probe vehicle speed, e.g. a speed that is 10, 15 or 20 miles-per-hour less than or greater than the average speed of the vehicle at a general location, time and day. Upon receipt of the notification, the center 16 is configured to generate a speed-related alert, such as "TRAFFIC SLOW" plus the nearest milestone or originating thoroughfare name. As further described and illustrated herein, the probe vehicle 12p constructs and utilizes a novel database of historic values to perform these functions.

In a preferred embodiment, the TIC 16 is more particularly configured to maintain and initially transmit to the probe vehicles 12p at least a portion of a master map database (not shown), either continuously, periodically, or upon request, so as to present a vehicle map database 20 at the probe vehicle 12p. The preferred vehicle map 20 comprises a plurality of interconnected links 22, wherein each link 22 is defined, for example, as an uninterrupted section of a thoroughfare having a constant anticipated traffic condition, such as a maximum speed limit. Each link 22 presents first and second link ends typically defined by intersections. More preferably, the map database 20 further identifies "superlinks" as thoroughfare or path sections comprising adjacent links having constant anticipated traffic conditions.

Figure 2:
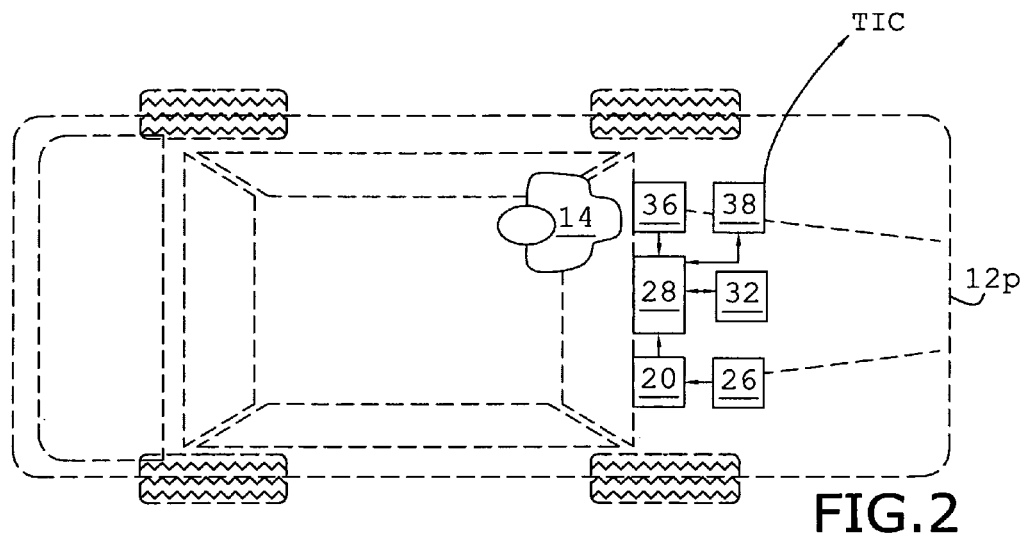
FIG. 2 is a plan view of a probe vehicle in accordance with a preferred embodiment of the present invention.

The system 10 further includes a locator device 24 preferably configured to locate the absolute point or position (e.g., latitude, longitude, and height) and heading of each vehicle 12. As shown in FIG. 2, for each vehicle 12 the locator device 24 may include a Global Positioning System (GPS) receiver 26 communicatively coupled to orbiting satellites. Alternatively, the locator device 24 may utilize a dead-reckoning system, network of cellular telephones, or a system using radio-frequency identification (RFID). Where a map database 20 is included, the receiver 26 is communicatively coupled to the map 20 and cooperatively configured to determine the current position of the vehicle 12 on the map 20.

Figure 1A:
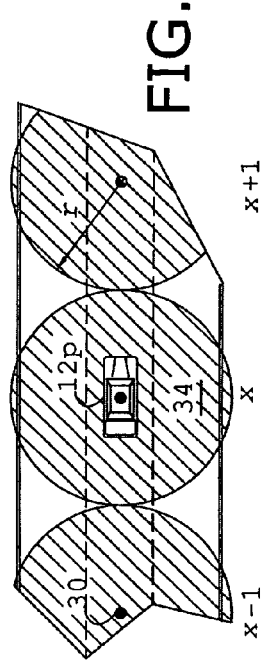
FIG. 1a is a plan view of a probe vehicle shown in FIG. 1, particularly illustrating a general position for three assessment points, x−1, x, and x+1.

Each probe vehicle 12p further includes a controller 28 programmably configured to cooperatively perform the functions of the system 10. The controller 28 is configured to determine or receive a current value of the traffic condition. More preferably, each probe vehicle 12p is configured to periodically determine a current value as it travels past a point (or position) 30 upon a link (or thoroughfare). Most preferably, a current value of the condition is determined at a period interval range of 1 to 10 seconds. The current value and current point 30 are correlated and stored in a relational database 32 also communicatively coupled to the controller 28. During subsequent trips that traverse the same point 30 under the same parameters, subsequent current values are determined and stored in a position/condition record in the condition database 32, so as to build a history of values. More preferably, the current value is correlated with a general position 34 that may be defined, for example, by a predetermined radius extending from the point 30. The preferred radius, r, produces a diameter at least equal to the distance traveled by the vehicle during a periodic assessment interval, or the width of the available travel path (see FIG. 1a), so as to increase the likelihood of obtaining matched assessments during subsequent trips.

As shown in FIG. 2, each probe vehicle 12p preferably includes at least one sensor 36 that is communicatively coupled to the controller 28 and configured to detect the current value of the condition. For example, a speedometer may be communicatively coupled to provide the current value of the vehicle speed on Mondays at 5:00 PM.

The condition is preferably a function of distinguishing parameters that typically affect the value. For example, the speed of the probe vehicle 12p may be determined in correlation with the time of day, day of the week, current or expected weather events, occurrence of construction or sporting events, a general heading, and other relevant factors. More preferably, a general time, i.e. a conditionally indistinguishable period, such as "from 9 A.M to 5 P.M.," and groups of like-weather events may be utilized. Other inputs such as third party data entry at the TIC 16, and physical relationships and computational conclusions based on road geometry may also be correlated with a current value of the condition.

The controller 28 is further configured to compare the current value to the historic values of the condition during each instance or trip, so as to determine a condition discrepancy. More preferably, the controller 28 is further configured to determine an average historic value of the condition, and the discrepancy is the absolute difference between the current and average values. Most preferably, a plus-and/or-minus discrepancy is determinable. Alternatively, the preferred comparison algorithm may initially determine a percentage ratio, the standard of deviation of the historic values, or a combination thereof to determine the condition discrepancy. The discrepancy is then compared to a predetermined threshold. To provide adjustability where desired (e.g. less traveled versus crowded links), the comparison algorithm and/or threshold are preferably modifiable by either the operator 14 or TIC 16. More preferably, a comparison algorithm factor or the threshold may be automatically adjusted by a link factor, when the vehicle 12p enters a particular link 22.

Finally, the preferred controller 28 is also configured to autonomously suppress the transmission of the notification when the current point is within a pre-determined traffic condition interruption zone (not shown), wherein said zone is defined by an area of travel that regularly exhibits a broad range of historic values. For example, with respect to speed conditions, an intersection controlled by traffic devices, such as stop signs, and traffic lights, may present an interruption zone. These zones may be manually entered into the controller 28 or map 20 prior to implementation of the system 10. More preferably, however, the controller 28 is configured to autonomously determine an interruption zone based on the standard of deviation of the historic values for the condition, i.e. where $\sigma > N$, a pre-determined maximum deviation. Most preferably, the controller 28 is further configured to suppress notification only when the current point is within an interruption zone and a pre-determined action is performed, such as applying a minimum brake pedal force, actuating a turn signal, or rotating the steering wheel a minimum degree.

Figure 3:
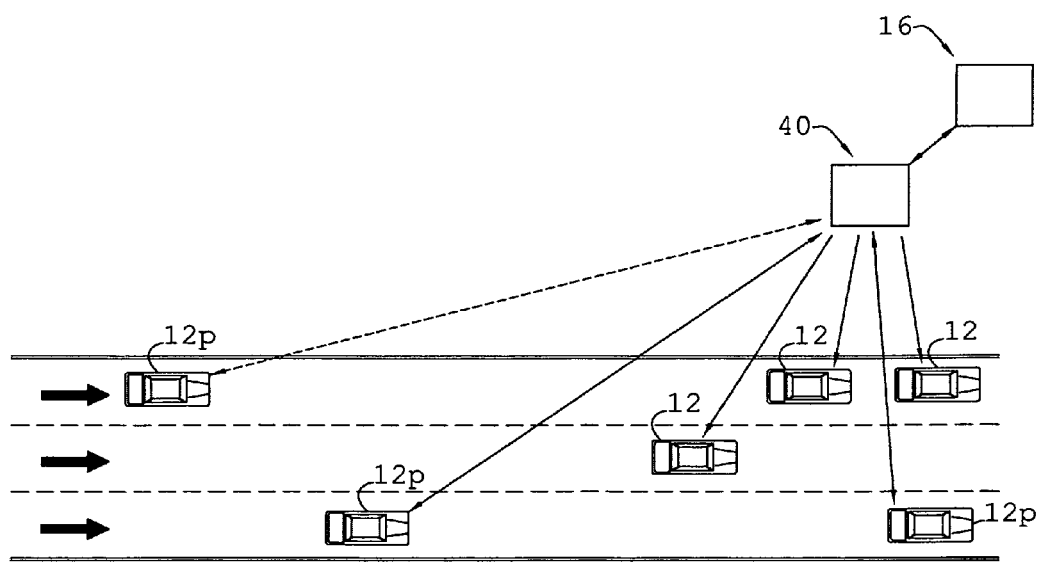
FIG. 3 is a plan view of a second preferred embodiment of the system, wherein the probe vehicles first communicate with an intermediary probe station communicatively coupled to the TIC.

The probe vehicle 12p includes suitable transmissions means for transmitting the notification to the TIC 16. More preferably, the probe vehicle 12p includes a long-range wireless communication processor 38 that is capable of real-time processing and transmission. Suitable transmission technology for this purpose include cellular data channels or phone transmissions, broadcast technologies, such as FM/XM frequencies, local and nation-wide wireless networks, such as the Internet, and mobile radio communication systems, such as GSM (Global System of Mobile Communication), GPRS (General Packet Routing System), and UMTS (Universal Mobile Telephone System).

Where at least one intermediary amplification or repetitive probe station 40 is incorporated as shown in FIG. 3, additional shorter range technologies, such as a Dedicated Short Range Communication (DSRC) system or a Short Message System (SMS), may be utilized by the probe vehicles 12*p*. In this configuration, the intermediary probe station 40 preferably includes the long-range communication processor 38 and communicates with the TIC 16. The TIC 16 may be configured to communicate directly back to the vehicles 12 or as shown in FIG. 3, also through the station 40. Finally, in a preferred embodiment, the medium- to long-range communication capability of the communication processor 38 may only be enabled when and while the probe vehicle 12*p* is in a pre-determined condition (e.g. in drive or gears greater than second) and disabled at all other times.

The communication processor 38 is provided with a predefined message protocol for accomplishing the functions relating to operation of the present invention. Implementation of the communication processor 38, and particularly the message protocol, can involve substantially conventional techniques and is therefore within the ability of one with ordinary skill in the art without requiring undue experimentation.

Thus, the probe vehicle 12*p* is configured to build a history of correlative values for a point by performing multiple trips past the point, and transmitting to the center 16 a notification only when a current value sufficiently differs from the historic values. By limiting transmissions to discrepancies only, it is appreciated that the frequency and volume of data that must be uploaded from the probe vehicles 12*p* is reduced. This in turn reduces the number of simultaneous communication channels required to report the data to the TIC 16 and reduces the amount of data, which must be processed in real-time at the TIC 16.

The probe vehicle 12*p* may be further configured to transmit notification of an exceeding discrepancy, only when achieved during multiple comparisons over a period interval. For example, a speed discrepancy may be determined once every five seconds for a minimum of twenty seconds, and the notification sent only if each of the four comparisons exceed the threshold. It is appreciated that this redundancy reduces notification of false traffic anomalies that may occur during evasive maneuvers or reactionary actions. In addition to or lieu of the speed condition described herein, the system 10 may be configured to determine and report other discrepant conditions, such as the actuation of exterior fog lights, or windshield wipers. Alternatively, redundancy can be provided at the center 16, by generating the alert only after receiving a plurality of notifications for a pre-determined period (e.g. 10 seconds).

As previously mentioned, the center 16 is preferably configured to receive notification of both plus and minus abnormal probe vehicle speeds. In this configuration, the center 16 is configured to generate a corresponding one of a plurality of traffic alerts, such as "TRAFFIC SLOW," "TRAFFIC JAM," and "TRAFFIC CLEAR" (see, FIG. 6*a*). The center 16 is further configured to determine and transmit the alert to a portion of receiving vehicles 12 within a predetermined area relative to the probe vehicle position, and more preferably, where a map database 20 is provided, to those receiving vehicles 12 that are located on or approaching the current thoroughfare or link. Alternatively, the alert may generate or modify a link's color upon the map 20, e.g. a yellow line color for links experiencing a traffic slow condition, a red line color for traffic jam condition, and a green line color for a traffic clear condition. At the center 16 the alert may be generated and transmitted autonomously, or manually.

The TIC 16 may be configured to continuously or periodically broadcast the updated map database and alerts within an operating area. In this configuration, the receiving vehicles 12 are configured to automatically receive at least a portion of the database and alerts from the broadcast depending upon their current positions without manual request.

Figure 4:
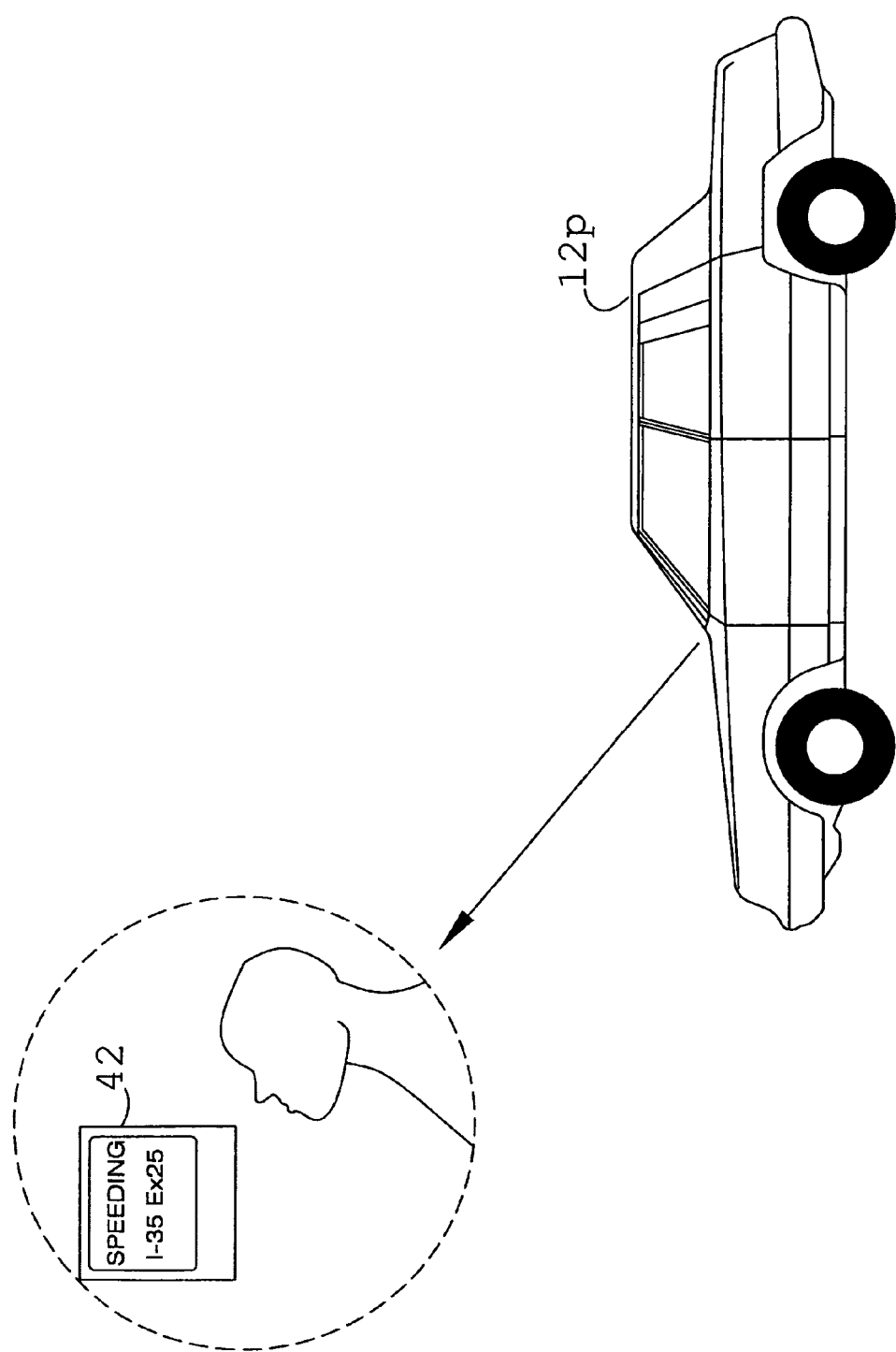
FIG. 4 is an elevation view of a probe vehicle and monitoring device, in accordance with a preferred embodiment of the present invention.

In an alternative embodiment shown in FIG. 4, the system 10 primarily functions to transmit the notification to a remote location, where a monitoring device 42 (or hand-held device) is located. The monitoring device 42 is configured to generate a humanly perceptible signal corresponding to the notification.

Figures 5, 6A:
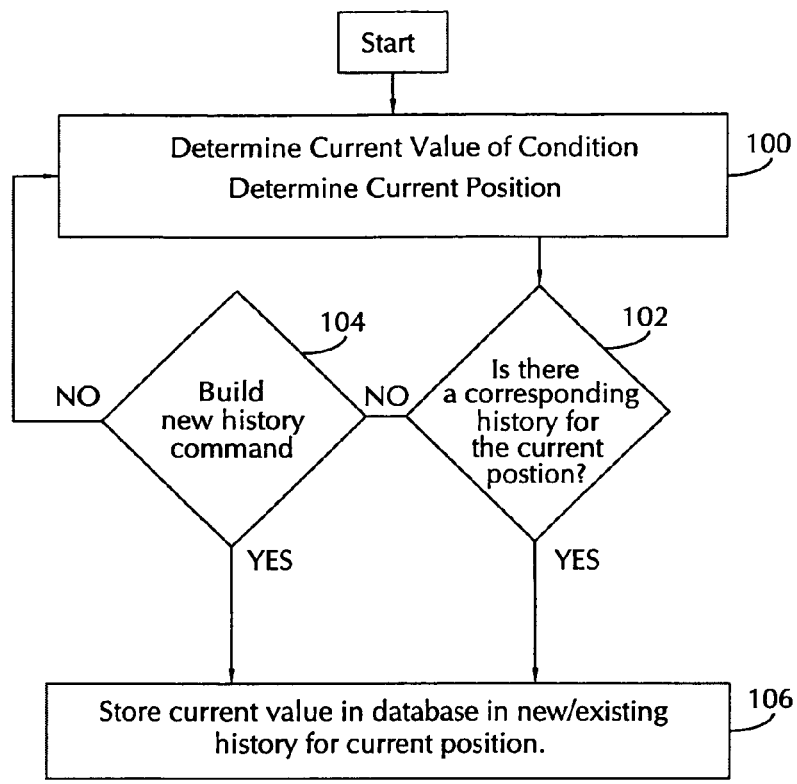
FIG. 5 is a flow chart of a method of building a history of traffic condition values, in accordance with a preferred embodiment of the present invention.
FIG. 6a is a table presenting an exemplary series of sequential probe vehicle speed condition entries, and corresponding probe vehicle and traffic information center actions during a trip, in accordance with a preferred embodiment of the present invention.
Figure 6:
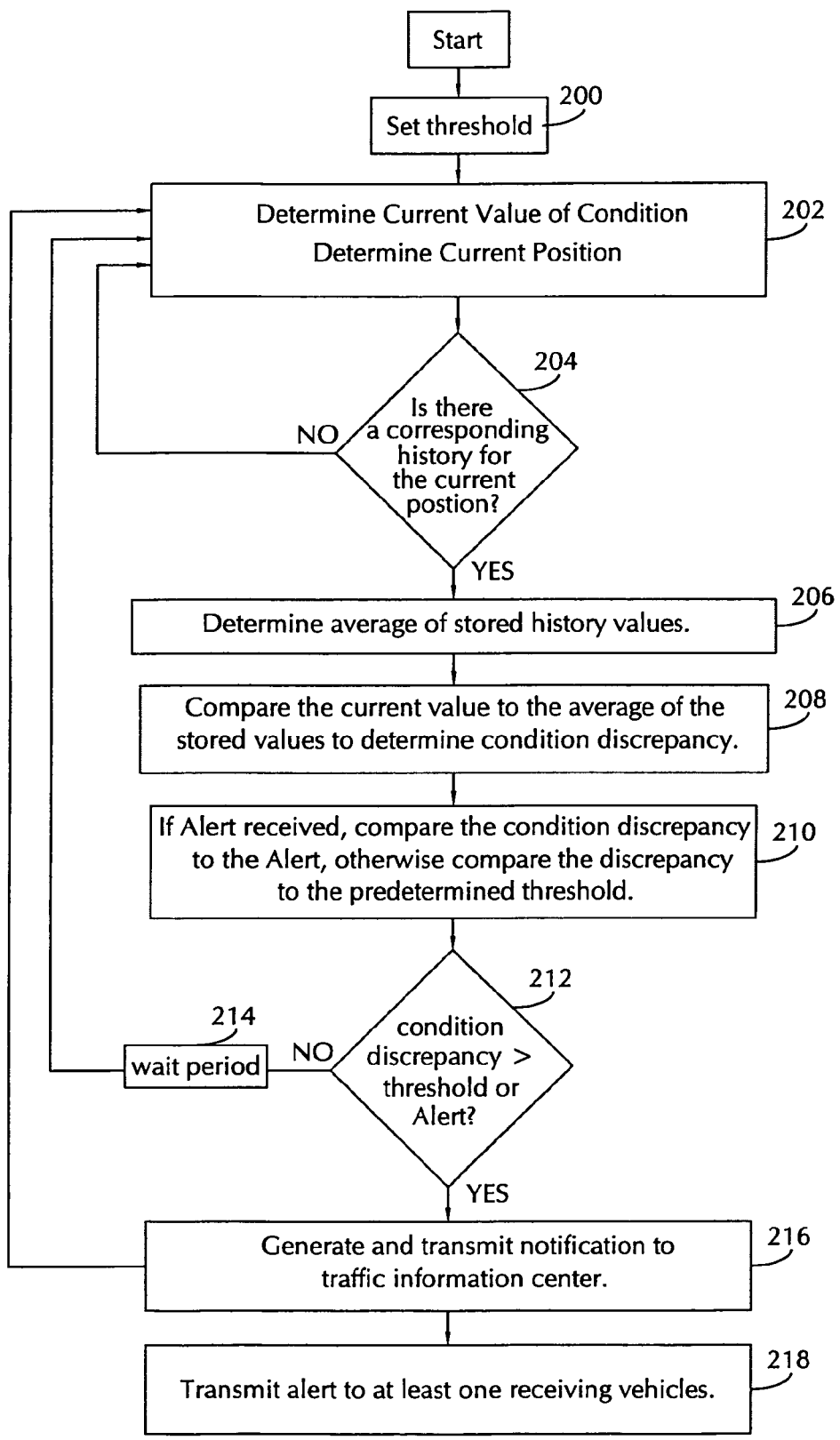
FIG. 6 is a flow chart of a method of determining and transmitting a traffic anomaly to at least one receiving vehicle.

In exemplary but non-limiting use and operation, a method of performing the present invention is illustrated in FIGS. 5 and 6. Referring first to FIG. 5, a method of building the database of historic values begins at a step 100 wherein a current value of a condition (e.g. speed: location=I-35 Exit 25, day=Monday, time=7:30 A.M.-8:00 A.M.) and a current position is determined. At a step 102, the probe vehicle 12*p* determines whether there is a corresponding history of condition values for the current position in the condition database 30. If YES, then the current value is added to the existing corresponding history record. Otherwise, at a step 104, the probe vehicle 12*p* determines whether a build-new-history command has been received from the operator 14. If YES, then the current value and position are added to the condition database to start a new history record. Otherwise, the method returns to step 100, as the vehicle 12*p* travels.

FIG. 6 presents a method of determining and transmitting to at least one receiving vehicle 12 an anomaly of a traffic condition. The exemplary method begins at a step 200 where plus-and/or-minus threshold(s) are set, so as to define the anomaly. At steps 202 and 204, a current value and position, and whether a corresponding history exists for the current position, are determined by the probe vehicle 12*p*. If YES, the probe vehicle 12*p* determines the average value of historic values, at a step 206. Otherwise, the method returns to step 202, as the vehicle 12*p* travels. Next, at a step 208, the current and average values are compared, so as to determine a condition discrepancy.

At steps 210 and 212, the discrepancy is compared to the predetermined threshold(s). If no alert has been received, and the discrepancy is within threshold limits, the method returns to step 202 after a predetermined waiting period at step 214. If an alert has not been received, and the discrepancy exceeds the threshold, notification of an anomaly is transmitted to the TIC 16 at step 216. Once a notification is received, and at step 218, the TIC 16 generates and transmits an alert to each receiving vehicles 12 within a predetermined area relative to the current position of the notifying probe vehicle 12*p*.

But if an alert has been received by the vehicle 12*p*, the discrepancy is compared to the alert to determine a condition alert status, i.e. whether the center 16 has already been notified of the discrepancy. If already alerted, notification is suppressed. For example, as shown in entry 4 of FIG. 6*a*, the probe vehicle 12*p* may determine a discrepancy of 29 mph below the average historic value, which exceeds a threshold of −20 mph, but suppress transmission of notification, because a corresponding speeding alert has been received. Once a subsequently determined compliant discrepancy indicates that a received alert is no longer true, a second notification is transmitted to the center 16 at step 216. Lastly, at step 218, the center 16 generates and transmits a removal signal to the receiving vehicles 12, so as to remove the alert signal.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. It is appreciated that the modes, modules, and components of the system 10 can be readily combined and/or fragmented without departing from the ambit of the invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A traffic information system for determining and communicating a traffic anomaly to at least one receiving vehicle, said system comprising:
   a traffic information center configured to determine and transmit an alert to at least one receiving vehicle; and
   at least one probe device communicatively coupled to the center, and configured to determine a current value of a traffic condition at a point during each of a plurality of trips, and store the current values in an on-board database, so as to build a history of condition values;
   said at least one probe device being further configured to compare each current value to the history of condition values, so as to determine a condition discrepancy during each trip, and transmit a notification to the center, only when the discrepancy is greater than a pre-determined discrepancy threshold,
   said center being further configured to generate the alert based upon the notification.

2. The system as claimed in claim 1,
   said probe device being configured to store the current value only upon receipt of a command from a user, so as to selectively build the history.

3. The system as claimed in claim 1, wherein a plurality of current values for a plurality of points are periodically determined during a trip.

4. The system as claimed in claim 3, wherein said period interval is between 1 to 10 seconds.

5. The system as claimed in claim 3, wherein a plurality of condition discrepancies are determined and compared to the threshold over a period window, and the notification is transmitted when each discrepancy is greater than the threshold.

6. The system as claimed in claim 1, wherein the probe device is a probe vehicle, the center transmits the alert to a plurality of receiving vehicles that includes the probe vehicle, and the probe vehicle is further configured to sequentially receive the alert, determine a subsequent current value and discrepancy, compare the subsequent discrepancy to the alert, so as to determine a condition alert status, and to suppress a subsequent transmission of the notification depending upon the condition alert status, during a trip.

7. The system as claimed in claim 1, wherein the center is further configured to cooperatively determine the alert based upon a plurality of notifications from a plurality of probe devices.

8. The system as claimed in claim 1, wherein the condition discrepancy is determined as a function of the absolute difference between the current value and the average of the historic values.

9. They system as claimed in claim 1, wherein the condition discrepancy is determined as a function of the statistical deviation of the historic values.

10. The system as set forth in claim 1, wherein each probe device is a probe vehicle, and configured to determine at least one condition parameter selected from the group consisting of a general time, general location, general heading, the day of the week, current or expected weather conditions, and the occurrence of a construction, accident, or sporting event.

11. The system as claimed in claim 10, wherein the speed of the probe vehicle at the general time, general position, and heading is determined.

12. The system as claimed in claim 11, wherein the discrepancy threshold is fifteen miles-per-hour.

13. The system as claimed in claim 10, wherein the probe vehicle includes a GPS receiver, the center and probe vehicle are cooperatively configured to locate the point relative to a map database, and the center is further configured to communicate the alert only to the receiving vehicles located within a predetermined area relative to the point.

14. The system as claimed in claim 1, wherein an intermediary probe station is communicatively coupled to the probe device and center, and configured to receive the notification from the device and transmit it towards the center.

15. The system as claimed in claim 14, wherein each probe device is a probe vehicle, and the probe station is configured to communicate with a plurality of probe vehicles using SMS communication.

16. The system as claimed in claim 14, wherein each probe device is a probe vehicle, and the probe station is configured to communicate with a plurality of probe vehicles using a DSRC system.

17. The system as claimed in claim 1, wherein the center is communicatively coupled to said at least one receiving vehicle and probe device by broadcast technology or through cellular data channels.

18. A traffic information system for determining and communicating a traffic anomaly to a remote location, said system comprising:
    at least one probe device configured to determine a current value of a condition at a point, during each of a plurality of trips, and store the current values in an on-board database, so as to build a history of condition values,
    said at least one probe device being further configured to compare the current value to the history of condition values, so as to determine a condition discrepancy during each trip, and transmit a notification to the remote location, only when the discrepancy is greater than a pre-determined discrepancy threshold; and
    a monitoring device located at the remote location, communicatively coupled to the probe device, and configured to generate a humanly perceptible signal upon receipt of the notification.

19. A traffic control system for communicating a traffic anomaly to at least one receiving vehicle upon a link, said system comprising:
    a traffic information center including a map database presenting a plurality of pre-defined links; and
    at least one probe vehicle communicatively coupled to the center, and configured to determine a current value of a condition at a point, during each of a plurality of trips, and store the current values in an on-board database, so as to present a history of condition values,
    said at least one probe vehicle being further configured to compare the current value to the history of condition values, so as to determine a condition discrepancy during each trip, and transmit a notification to the center, only when the discrepancy is greater than a pre-determined discrepancy threshold, said center being further configured to generate an alert based upon the notification, to determine the position of the point upon the map database, and to transmit the alert to said at least one receiving vehicle, when said position is located within a predetermined area relative to the link.

20. The system as claimed in claim 19, wherein the probe vehicle is configured to autonomously suppress the transmission of the notification, when the position is within a predetermined traffic interruption zone.

21. The system as claimed in claim 20, wherein the zone is autonomously determined by the probe vehicle, and is based on the standard of deviation of the historic values.

22. The system as claimed in claim 20, wherein the probe vehicle is further configured to suppress the determination of the current value, only when the position is within the zone and a predetermined action is performed.

23. The system as claimed in claim 22, wherein the predetermined action is the application of a minimum brake force, actuation of a turn signal, or the minimum rotation of the steering wheel.

24. The system as claimed in claim 19, wherein the probe vehicle stores a copy of the map database, determines the position of the point relative thereto, and transmits the notification and the current relative position to the center, when the discrepancy is greater than the pre-determined discrepancy threshold.

* * * * *